United States Patent
Ohata et al.

(10) Patent No.: US 11,247,774 B2
(45) Date of Patent: Feb. 15, 2022

(54) MOVING BODY IDENTIFICATION SYSTEM AND IDENTIFICATION METHOD

(71) Applicant: Hitachi, Ltd., Tokyo (JP)

(72) Inventors: Kaori Ohata, Tokyo (JP); Chiaki Yamashita, Tokyo (JP); Koichiro Nariai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 201 days.

(21) Appl. No.: 15/747,840

(22) PCT Filed: Mar. 10, 2016

(86) PCT No.: PCT/JP2016/057533
§ 371 (c)(1),
(2) Date: Jan. 26, 2018

(87) PCT Pub. No.: WO2017/017984
PCT Pub. Date: Feb. 2, 2017

(65) Prior Publication Data
US 2018/0222582 A1    Aug. 9, 2018

(30) Foreign Application Priority Data

Jul. 29, 2015  (JP) .............................. JP2015-149821

(51) Int. Cl.
*B64C 39/02* (2006.01)
*G08G 5/00* (2006.01)
(Continued)

(52) U.S. Cl.
CPC .............. *B64C 39/024* (2013.01); *B64F 1/36* (2013.01); *G06T 1/0007* (2013.01); *G08B 25/10* (2013.01);
(Continued)

(58) Field of Classification Search
None
See application file for complete search history.

(56) References Cited

U.S. PATENT DOCUMENTS 9,373,014 B1 * 6/2016 Mehranfar ............ H04W 4/008
9,412,278 B1 * 8/2016 Gong ................... G08G 5/0091
(Continued)

FOREIGN PATENT DOCUMENTS

CN          101261771 A      9/2008
CN          101573911 A      11/2009
(Continued)

OTHER PUBLICATIONS

International Search Report (PCT/ISA/210) issued in PCT Application No. PCT/JP2016/057533 dated Jun. 14, 2016 with English-language translation (three (3) pages).
(Continued)

*Primary Examiner* — Peter D Nolan
*Assistant Examiner* — Demetra R Smith-Stewart
(74) *Attorney, Agent, or Firm* — Crowell & Moring LLP

(57) ABSTRACT

A moving body identification system for identifying moving bodies, whereby: moving state information is acquired, including first position information of multiple moving bodies which are detected by a moving state monitoring device monitoring moving states of the moving bodies; predetermined report information is acquired from the moving bodies, including second position information of the moving bodies measured by themselves; and registration statuses of the moving bodies are identified on the basis of the first position information and the second position information.

10 Claims, 16 Drawing Sheets

(51) Int. Cl.
    *G08B 25/10*      (2006.01)
    *H04L 29/12*      (2006.01)
    *H04L 9/08*      (2006.01)
    *H04Q 9/02*      (2006.01)
    *G06T 1/00*      (2006.01)
    *B64F 1/36*      (2017.01)

(52) U.S. Cl.
    CPC .......... *G08G 5/006* (2013.01); *G08G 5/0069* (2013.01); *G08G 5/0078* (2013.01); *H04L 9/0863* (2013.01); *H04Q 9/02* (2013.01); *B64C 2201/141* (2013.01); *B64C 2201/145* (2013.01)

(56) References Cited

U.S. PATENT DOCUMENTS

| | | | |
|---|---|---|---|
| 10,023,091 B2* | 7/2018 | Bendewald | B60N 3/001 |
| 2003/0093187 A1* | 5/2003 | Walker | B64D 45/0034 |
| | | | 701/1 |
| 2009/0138716 A1 | 5/2009 | Leclercq et al. | |
| 2011/0071704 A1 | 3/2011 | Matos | |
| 2012/0131650 A1 | 5/2012 | Gutt et al. | |
| 2012/0296497 A1 | 11/2012 | Lee et al. | |
| 2014/0172194 A1* | 6/2014 | Levien | G08G 5/0091 |
| | | | 701/2 |
| 2014/0303884 A1* | 10/2014 | Levien | G08G 5/04 |
| | | | 701/301 |
| 2015/0142211 A1* | 5/2015 | Shehata | H04N 7/181 |
| | | | 701/2 |
| 2015/0336667 A1* | 11/2015 | Srivastava | B64C 39/024 |
| | | | 701/2 |
| 2015/0336668 A1* | 11/2015 | Pasko | B64C 39/024 |
| | | | 701/2 |
| 2015/0336669 A1* | 11/2015 | Kantor | G08G 5/0013 |
| | | | 701/3 |
| 2016/0189101 A1* | 6/2016 | Kantor | G08G 5/0026 |
| | | | 705/338 |
| 2016/0196525 A1* | 7/2016 | Kantor | G08G 5/0013 |
| | | | 705/330 |
| 2016/0247404 A1* | 8/2016 | Srivastava | G01C 21/20 |
| 2016/0300495 A1* | 10/2016 | Kantor | G08G 5/0082 |
| 2016/0328979 A1* | 11/2016 | Postrel | H04W 4/46 |
| 2017/0025021 A1* | 1/2017 | Song | G08G 5/0013 |
| 2017/0032587 A1* | 2/2017 | Cheatham, III | G06Q 10/0833 |
| 2017/0069214 A1* | 3/2017 | Dupray | G08G 5/0021 |
| 2017/0263132 A1* | 9/2017 | Butler | G08G 5/0013 |
| 2018/0157255 A1* | 6/2018 | Halverson | B64C 39/024 |
| 2018/0253092 A1* | 9/2018 | Trapero Esteban | H04W 12/06 |
| 2019/0114925 A1* | 4/2019 | Schulman | G06F 21/31 |

FOREIGN PATENT DOCUMENTS

| | | |
|---|---|---|
| CN | 102622783 A | 8/2012 |
| CN | 102622784 A | 8/2012 |
| CN | 102622785 A | 8/2012 |
| CN | 202904328 U | 4/2013 |
| CN | 103222228 A | 7/2013 |
| EP | 2 290 491 A3 | 9/2012 |
| JP | 2000-130995 A | 5/2000 |
| JP | 2003-67899 A | 3/2003 |
| JP | 2004-175209 A | 6/2004 |
| JP | 2009-211361 A | 9/2009 |
| KR | 10-1475629 B1 | 12/2014 |
| WO | WO 2011/064565 A2 | 6/2011 |
| WO | WO 2015/049681 A1 | 4/2015 |
| WO | WO 2016/154949 A1 | 10/2016 |

OTHER PUBLICATIONS

Japanese-language Written Opinion (PCT/ISA/237) issued in PCT Application No. PCT/JP2016/057533 dated Jun. 14, 2016 (three (3) pages).
Australian Office Action issued in counterpart Australian Application No. 2016300342 dated Nov. 28, 2018 (five pages).
Australian Office Action issued in counterpart Australian Application No. 2016300342 dated Jun. 11, 2019 (four pages).
Chinese-language Office Action issued in Chinese Application No. 201680043681.7 dated Mar. 31, 2020 (13 pages).
Cover Page of EP 2 509 864 A2 published Oct. 17, 2012 (one (1) page).

* cited by examiner

Fig. 6

| | Drone identification result management table T20 | | |
|---|---|---|---|
| C200 | C201 | C202 | C203 |
| Management number | Query information decryption result | Position information | Drone ID |
| #1 | ○ | ○ | ○ |
| #2 | ○ | ○ | ○ |
| #3 | ○ | ○ | ○ |
| #4 | × | ○ | — |
| #5 | × | × | — |

Fig. 7

| Drone name | Drone ID C211 | One-time password (OTID_B) C212 | Query information decryption result C213 | Position information C214 | | | |
|---|---|---|---|---|---|---|---|
| C210 | | | | Latitude | Longitude | Altitude | ... |
| Legitimate drone 1 | 0001 | B0001 | D11 | lat 1 | lng 1 | h1 | ... |
| Legitimate drone 2 | 0002 | B0002 | D12 | lat 2 | lng 2 | h2 | ... |
| Legitimate drone 3 | 0003 | B0003 | D13 | lat 3 | lng 3 | h3 | ... |

Legitimate drone management table T21

MOVING BODY IDENTIFICATION SYSTEM AND IDENTIFICATION METHOD

TECHNICAL FIELD

The present invention relates to a moving body identification system and an identification method.

BACKGROUND ART

Recently, unmanned aircraft as a kind of moving body, commonly called drones, have become popular. Various unmanned aircraft ranging from a small aircraft in dozen centimeters to a large aircraft in dozen meters have been manufactured, and their various usages include aerial image capturing and observation. Applications of unmanned aircraft are expected to further increase in the future, but unregulated and uncontrolled flight is not preferable for safety.

PTL 1 discloses a conventional technology of automatically avoiding any other drone when having sensed its approach.

CITATION LIST

Patent Literature

[PTL 1] Japanese Patent Laid-Open No. 2004-175209

SUMMARY OF INVENTION

Technical Problem

The conventional technology is able to only avoid contact between unmanned aircraft but is unable to distinguish legitimate unmanned aircraft registered in advance and other unmanned aircraft (illegitimate unmanned aircraft) when they are flying in the same airspace.

The present invention is intended to solve the above-described problem by providing a moving body identification system and an identification method that are capable of identifying any legitimate moving body.

Solution to Problem

To solve the above-described problem, in a moving body identification technology according to the present invention, moving state information including first position information of multiple moving bodies sensed by a moving state monitoring device configured to monitor a moving state of a moving body is acquired, predetermined report information including second position information of the moving body measured by the moving body is acquired from the moving body, and a registration status of the moving body is identified based on the first position information and the second position information.

Advantageous Effect of Invention

According to the present invention, it is possible to identify which moving bodies among multiple moving bodies are legitimate. In addition, any moving body remaining after any legitimate moving body is removed from among the multiple moving bodies is illegitimate, and thus the present invention can distinguish legitimate and illegitimate moving bodies among the multiple moving bodies.

BRIEF DESCRIPTION OF DRAWINGS

FIG. 6 illustrates an exemplary table for managing a moving body identification result.

FIG. 7 illustrates an exemplary table for managing a legitimate moving body identification result.

DESCRIPTION OF EMBODIMENTS

Embodiments of the present invention will be described below with reference to the accompanying drawings. The present embodiment describes an application to identification of an unmanned aircraft (what is called a drone) as an exemplary "moving body". In the present embodiment, a moving body is not limited to a flying moving body, but may be a moving body that moves on the ground or a moving body that moves on or in water. A moving body according to the present embodiment is an unmanned moving body. The unmanned moving body means a moving body with no pilot on board, and a crew or a passenger other than a pilot may be on board the moving body. In the present embodiment, a group of flying unmanned aircraft are monitored to identify which unmanned aircraft are legitimate in real time. The identification of a legitimate unmanned aircraft leads to real-time identification of which unmanned aircraft are illegitimate. A result of the unmanned aircraft identification can be output to an external system so that an alert is emitted.

Embodiment 1

Figure 1:
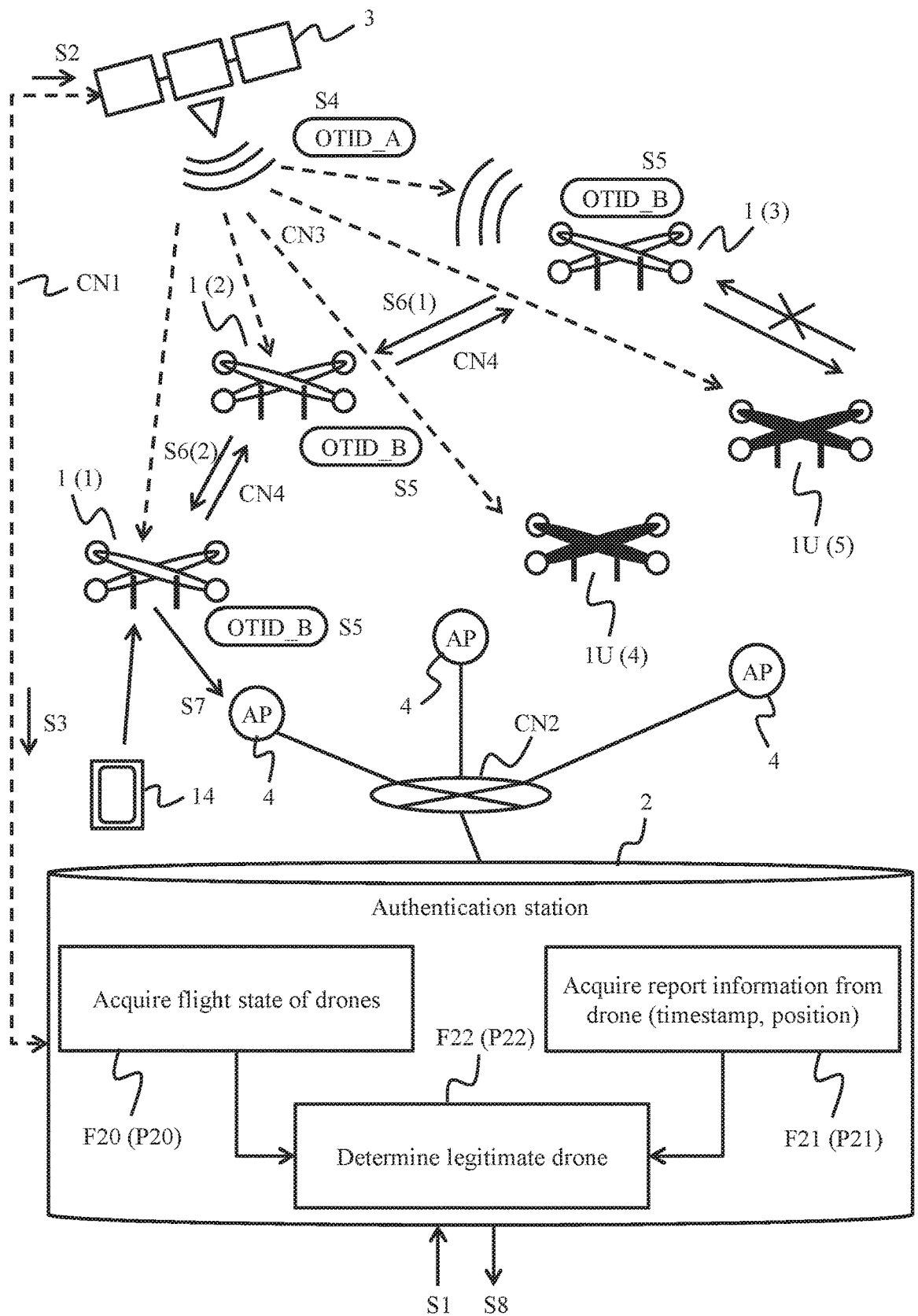
FIG. 1 illustrates an entire schematic diagram of a moving body identification system according to a first embodiment.

The following describes a first embodiment with reference to FIGS. 1 to 12. FIG. 1 illustrates an entire schematic diagram of an unmanned aircraft identification system as a "moving body identification system" according to the present embodiment. In the embodiments including the present embodiment, an "unmanned aircraft identification system" is described as an exemplary "moving body identification system". FIG. 1 illustrates a situation in which multiple unmanned aircraft (drones) 1(1) to 1(3), 1U(4), and 1U(5) as exemplary "moving bodies" are flying in a predetermined area. An unmanned aircraft is an unmanned object that flies through remote operation or through automatic operation by computer control. Examples of unmanned aircraft include a helicopter type and an airplane type in various sizes. The predetermined area is a range of monitoring unmanned aircraft, and the size thereof can be set as appropriate. For example, the predetermined area may be set to be the entire country such as Japan or an administrative division such as a prefecture or a city. The predetermined area may be set to be a facility such as a public office, a power plant, an amusement park, a park, a hospital, a factory, or a commercial facility. In addition, the predetermined area may be set to be a geographical element such as a river, a road, or a mountain.

FIG. 1 illustrates a mixture of the legitimate unmanned aircraft 1(1) to 1(3) and the illegitimate unmanned aircraft 1U(4) and 1U(5). The legitimate unmanned aircraft 1(1) to 1(3) are unmanned aircraft registered to an authentication station 2 to be described later. The illegitimate unmanned aircraft 1U(4) and 1U(5) are unmanned aircraft not registered to the authentication station 2 or unmanned aircraft, registration valid durations of which have expired at the authentication station 2.

Figure 12:
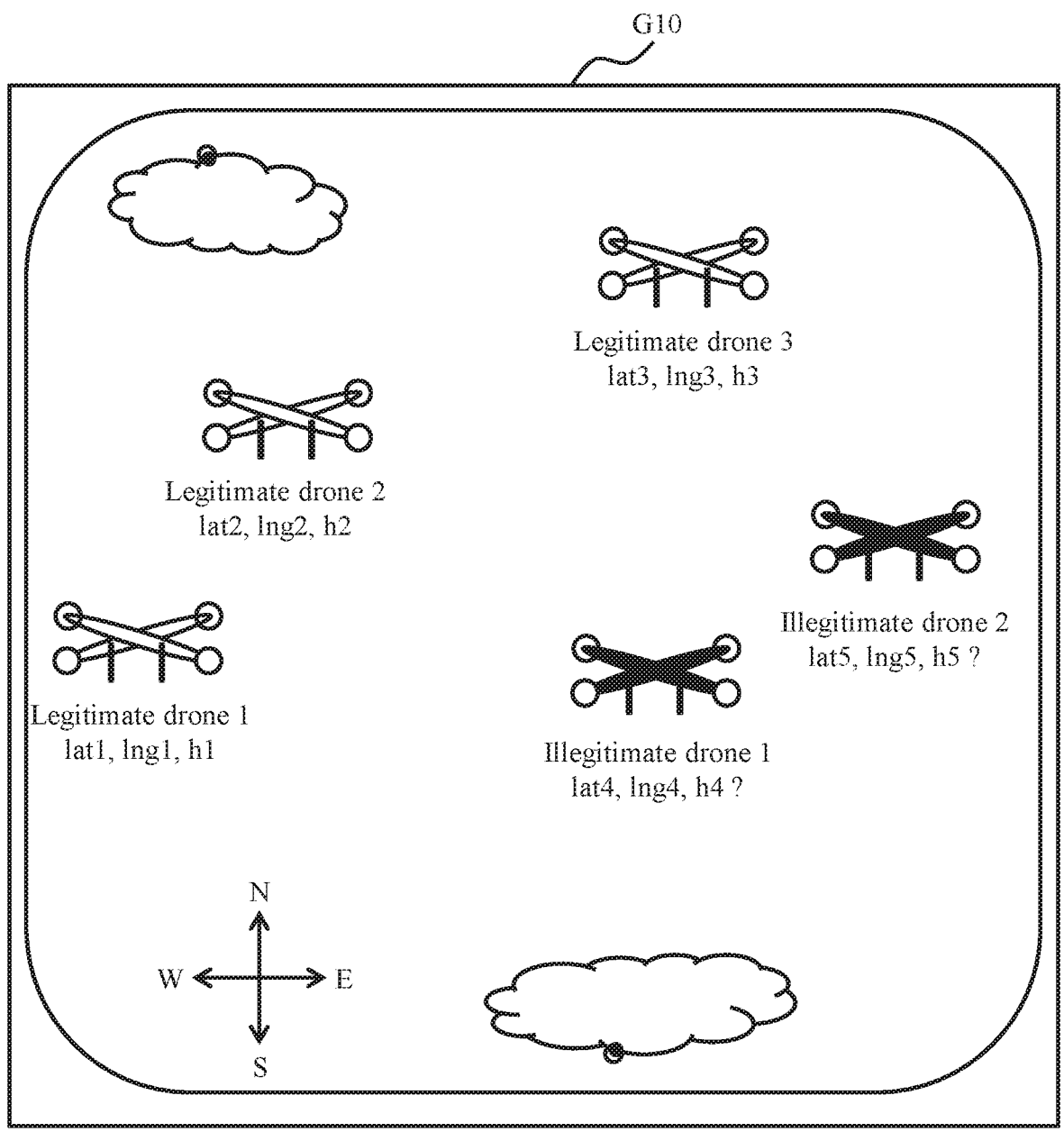
FIG. 12 illustrates an exemplary screen displaying a moving body identification result.

In FIG. 1, the legitimate unmanned aircraft and the illegitimate unmanned aircraft are denoted by consecutive numbers (1) to (5) without distinction. Among the illegitimate unmanned aircraft 1U, the unmanned aircraft 1U(4) is a first illegitimate unmanned aircraft, and the unmanned aircraft 1U(5) is a second illegitimate unmanned aircraft. In FIG. 12 to be described later, legitimate unmanned aircraft in a group or illegitimate unmanned aircraft in a group are denoted by consecutive numbers within the group. Hereinafter, an unmanned aircraft is also referred to as a drone. When not distinguished, legitimate and illegitimate unmanned aircraft are collectively referred to as the unmanned aircraft 1 (drone 1) in some cases.

The unmanned aircraft identification system includes, for example, the authentication station 2, a satellite 3, a wireless LAN access point 4, and a communication network CN2. A user can provide an instruction to the drone 1 or read data therefrom by using a user terminal 14 such as a dedicated remote controller or a smartphone.

The authentication station 2 is a computer system configured to authenticate whether the drone 1 as an identification target is a registered drone. The authentication station 2 may be installed for each predetermined area or may be installed for multiple predetermined areas (monitoring ranges). For example, a single authentication station may be installed for the entire region of Japan to monitor drones in Japan, and or a sub authentication station may be installed for each area or each facility. The authentication station 2 does not need to be fixedly installed but may be configured as a movable system. For example, the authentication station 2 may be installed on a temporary basis to monitor drones in a particular area or facility only for a particular duration.

The authentication station 2 has multiple functions F20, F21, and F22. The flight state acquisition function F20 is a function to sense a flight state (position information) by detecting a moving body based on a profile obtained from, for example, an optical image captured by a camera or the like, radio wave emitted by a radar or the like, or sound wave or ultrasonic wave emitted by a sonar, a microphone, or the like. The flight state acquisition function F20 acquires the flight state by a method different from a method of communicating with a drone to be described later, irrespective of whether a drone is registered or whether a communication reply is obtained. For example, the flight state acquisition function F20 is a function to acquire the flight state of a drone from a flight state monitoring device such as the satellite 3 positioned in a space overhead a predetermined area. The "overhead space" may be referred to as "one side". The satellite 3 may be referred to as a "one-side moving state monitoring device". The flight state acquisition function F20 is achieved by, for example, an image analysis program P20 to be described later. The flight state as an exemplary "moving state" includes the position information of a drone (legitimate or illegitimate) flying or parking in a monitoring range. The flight state may include a moving direction and a moving speed in addition to the position information. The position information, the moving direction, and the moving speed can be detected by analyzing multiple satellite images received from the satellite 3 at time intervals.

The report information acquisition function F21 is a function to transmit query information to a group of drones to be identified and receive report information from any legitimate drone among the group of drones. The report information acquisition function F21 can be achieved by, for example, a drone authentication management program P21 to be described later.

The legitimate drone determination function F22 is a function to identify any legitimate drone from among a group of drones to be identified based on the report information and the flight state. Since any legitimate drone can be distinguished in this manner, any drone other than the legitimate drone among the group of drones can be identified as an illegitimate drone. The legitimate drone determination function F22 can be achieved by, for example, a legitimate drone determination program F22 to be described later.

The following describes the entire operation of the unmanned aircraft identification system with reference to FIG. 1. First, registration processing (S1) is executed. A user who intends to fly a drone registers information related to the drone to the authentication station 2. When having authenticated registration of the drone, the authentication station 2 issues a one-time password (OTID_B) as encryption control information. The user downloads the one-time password to the drone and stores the one-time password therein. The one-time password is an exemplary highly transitory password. Thus, the present embodiment employs the one-time password as exemplary highly transitory encryption control information. However, the present embodiment is not limited to the one-time password but may employ any encryption control information that can be used to identify whether a drone is legitimate or illegitimate, such as a password other than the one-time password or a decryption program.

Thereafter, the authentication station 2 periodically or not periodically identifies a group of drones. The authentication station 2 may identify a group of drones in a predetermined period or at a time specified by, for example, a system administrator. Alternatively, the authentication station 2 may identify a group of drones when a trigger such as an alert signal is input from an external system.

At the identification of a group of drones, the authentication station 2 requests the satellite 3 to transmit encrypted query information to the group of drones to be identified (S2). The query information includes a query time. The query information may include information (such as an authentication station ID and position information) for identifying the authentication station 2 in addition to the query time. The query information is encrypted with a one-time password (OTID_A).

Having received the request to transmit the query information from the authentication station 2 through a communication network CN1, the satellite 3 captures an image of an image capturing target air area (including a predetermined area), and transmits the image to the authentication station 2 (S3). In addition, the satellite 3 transmits encrypted query information at once toward the air area including the predetermined area (S4). The transmission of query information may employ, for example, data broadcast CN3 of the satellite 3. Query information may be transmitted first, and subsequently, a satellite picture may be captured, or the transmission of query information and the capturing of a satellite picture may be performed simultaneously.

The legitimate drones 1(1) to 1(3) among the group of drones each acquire the one-time password (OTID_B) at registration to the authentication station 2 and hold the one-time password. Having received the encrypted query information, each legitimate drone decrypts the query information by using the one-time password (OTID_B) (S5). The illegitimate drones 1U(4) and 1U(5) does not hold the one-time password (OTID_B) and cannot decrypt the query information.

Having decrypted the query information, each legitimate drone generates the report information including a result of the decryption and the position information of the drone. The report information includes, for example, the query time included in the query information and the latest position information of the legitimate drone. The report information may further include information for identifying the authentication station 2 by which the query information is issued, information indicating the moving direction and speed of the legitimate drone, and a management number (drone ID) of the legitimate drone at registration. The report information is preferably encrypted in a format that allows decryption only at the authentication station 2 and the legitimate drone. This is to prevent the illegitimate drone 1U from pretending to be a legitimate drone by transmitting fake report information to the authentication station 2.

When direct communication is possible with the wireless access point 4, a legitimate drone can send the report information to the authentication station 2 by transmitting the report information to the wireless access point 4. In FIG. 1, the legitimate drone 1(1), which is close to the ground, can directly transmit the report information to the wireless access point 4 (S7).

When a legitimate drone is distant from the wireless access point 4 and cannot perform direct communication, the legitimate drone forwards the report information to another legitimate drone. In FIG. 1, legitimate drone 1(3) forwards the report information of the legitimate drone 1(3) to another legitimate drone 1(2) positioned in a range in which wireless communication CN4 is possible (S6(1)).

The legitimate drone 1(2) forwards the report information of the legitimate drone 1(2) and the report information received from the legitimate drone 1(3) to the legitimate drone 1(1) through the wireless communication CN4 (S6(2)). The legitimate drone 1(1) transmits the report information of the legitimate drone 1(2) and the report information of the legitimate drone 1(3) to the wireless access point 4 (S7).

The legitimate drone 1(1) may transmit the report information to the wireless access point 4 at a timing when the legitimate drone 1(1) receives the report information from the other legitimate drones 1(2) and 1(3). Alternatively, the legitimate drone 1(1) may transmit, to the wireless access point 4, the report information from the other legitimate drones 1(2) and 1(3) at a timing when the legitimate drone 1(1) transmits the report information of the legitimate drone 1(1) to the authentication station 2.

The authentication station 2 determines whether any of the group of drones is legitimate or illegitimate based on a result of analysis on the satellite picture acquired from the satellite 3, and the report information acquired from a legitimate drone. For example, the analysis of the satellite picture determines the position of each drone at an image capturing time corresponding to an issue time of the query information. The report information acquired by the authentication station 2 from a legitimate drone as a response to the query information includes the position information of the legitimate drone.

The authentication station 2 compares position information (and at least one of a moving direction and a moving speed) obtained from the result of analysis on the satellite picture, and position information (and at least one of a moving direction and a moving speed) obtained from a result of decryption of the report information. Accordingly, the authentication station 2 can identify which drone among the group of drones in the satellite picture is legitimate. The authentication station 2 may output a drone identification result (S8). For example, an external alarming system may emit an alert based on the drone identification result received from the authentication station 2. The drone identification result may be displayed through the user terminal 14 or the like as described in an embodiment to be described later.

Figure 2:
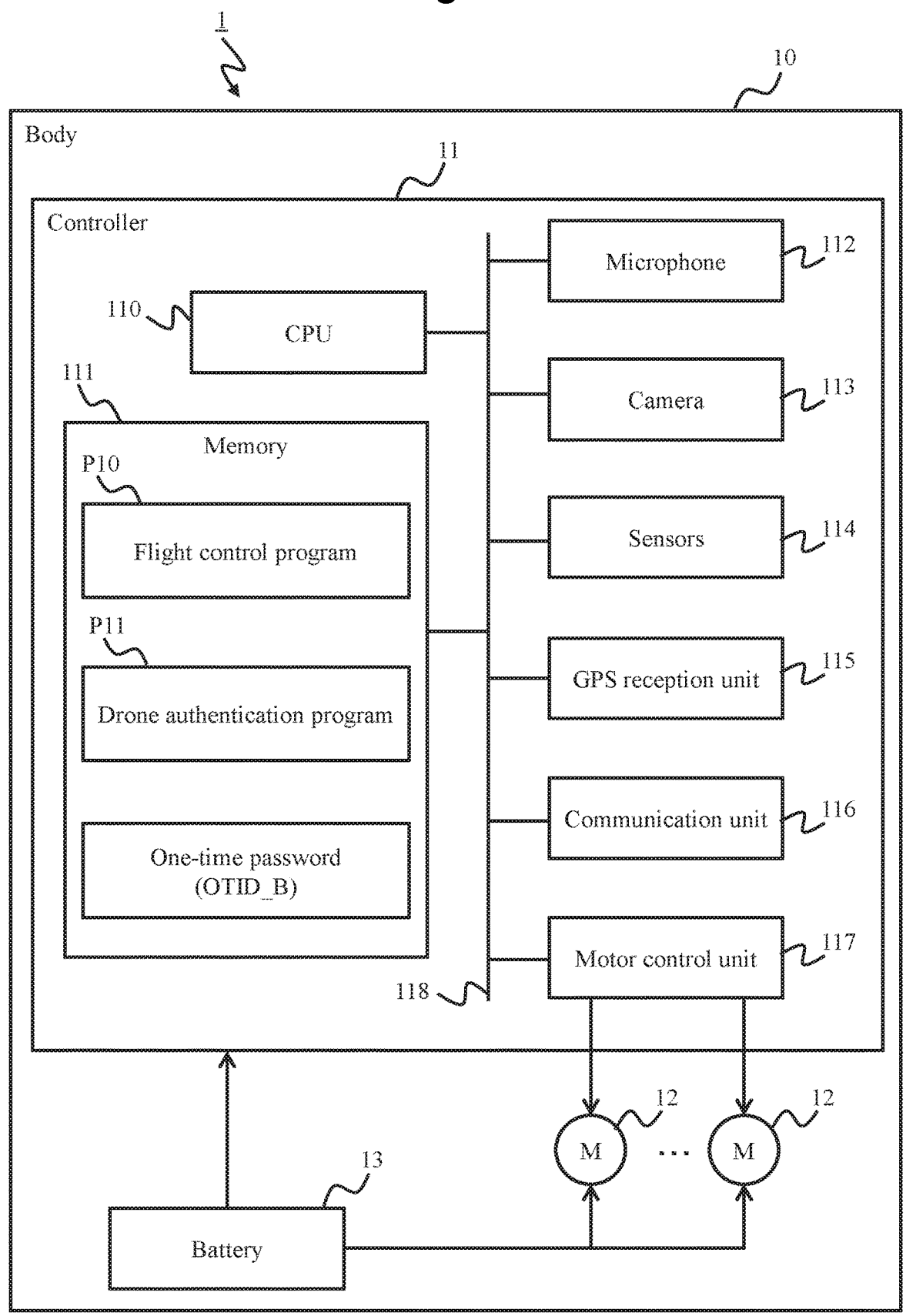
FIG. 2 is a configuration diagram of a legitimate moving body (drone).

FIG. 2 is a hardware configuration diagram of a legitimate drone. The legitimate drone 1 includes, for example, a body 10, a controller 11, a motor 12 configured to drive, for example, a rotor, and a battery 13 configured to supply electrical power to the controller 11 and the motor 12. The controller 11 controls flight of the drone and includes, for example, a micro processor 110, a memory 111, a microphone 112, a camera 113, sensors 114, a GPS reception unit 115, a communication unit 116, and a motor control unit 117.

The micro processor (in FIG. 2, CPU) 110 achieves a predetermined function by executing each of computer programs P10 and P11 stored in the memory 111. The memory 111 as a storage device stores the flight control program P10, the drone authentication program P11, and the one-time password (OTID_B) as the encryption control information. Description of an operating system and various drivers is omitted. The flight control program P10 is a computer program that allows the drone to fly in air through remote operation or automatic control. The drone authentication program P11 is a computer program for authenticating that the drone is legitimate, and cooperates with software of the authentication station 2. The drone authentication program P11 achieves a function to generate the report information based on the query information received from the authentication station 2 through the satellite 3, a function to forward the report information received from a legitimate drone to another legitimate drone or the wireless access point 4, and a function to detect any other drone flying around the own drone, to which the report information is to be forwarded.

The microphone 112 and the camera 113 serve as a drone detection unit for detecting any drone flying around the own drone. For example, flight noise of any other drone is detected by analyzing sound detected by the microphone 112 in surrounding environment. For example, the existence of any other drone is detected by analyzing an image captured by the camera 113 in surrounding environment. The existence of any other drone may be sensed based on comprehensive determination on a result of the analysis on sound detected by the microphone 112 and a result of the analysis on an environment image detected by the camera 113. The drone detection unit is not limited to the microphone 112 and the camera 113, but may be, for example, a magnetic sensor.

The sensors 114 are measuring units such as a pressure altitude sensor, a triaxial accelerometer, a triaxial gyro sensor, a ground speed meter, a geomagnetic sensor, a pressure sensor, an infrared sensor, a temperature sensor, and a humidity sensor. The above-described sensors are exemplary, and not all sensors need to be included in a drone. Only some sensors in accordance with usage of the drone need to be mounted.

The global positioning system (GPS) reception unit 115 is a device for receiving the position information of the own drone from a GPS. The communication unit 116 is a device for achieving communication among the satellite 3, the GPS, the wireless access point 4, and any other drone. The motor control unit 117 is a device for controlling the motor 12.

Although FIG. 2 illustrates an example in which the drone authentication program P11 is implemented as a computer program, the present invention is not limited thereto. At least part of the functions achieved by the drone authentication program P11 may be achieved by a dedicated hardware circuit instead. For example, the function to decrypt query information by using a one-time password may be achieved by a hardware circuit and a computer program in cooperation. Any other functional configuration in the description can be implemented by any one of a hardware circuit and software or by both in cooperation. Any function implementation method is applicable. Application of any implementation method is included in the scope of the present invention.

Figure 3:
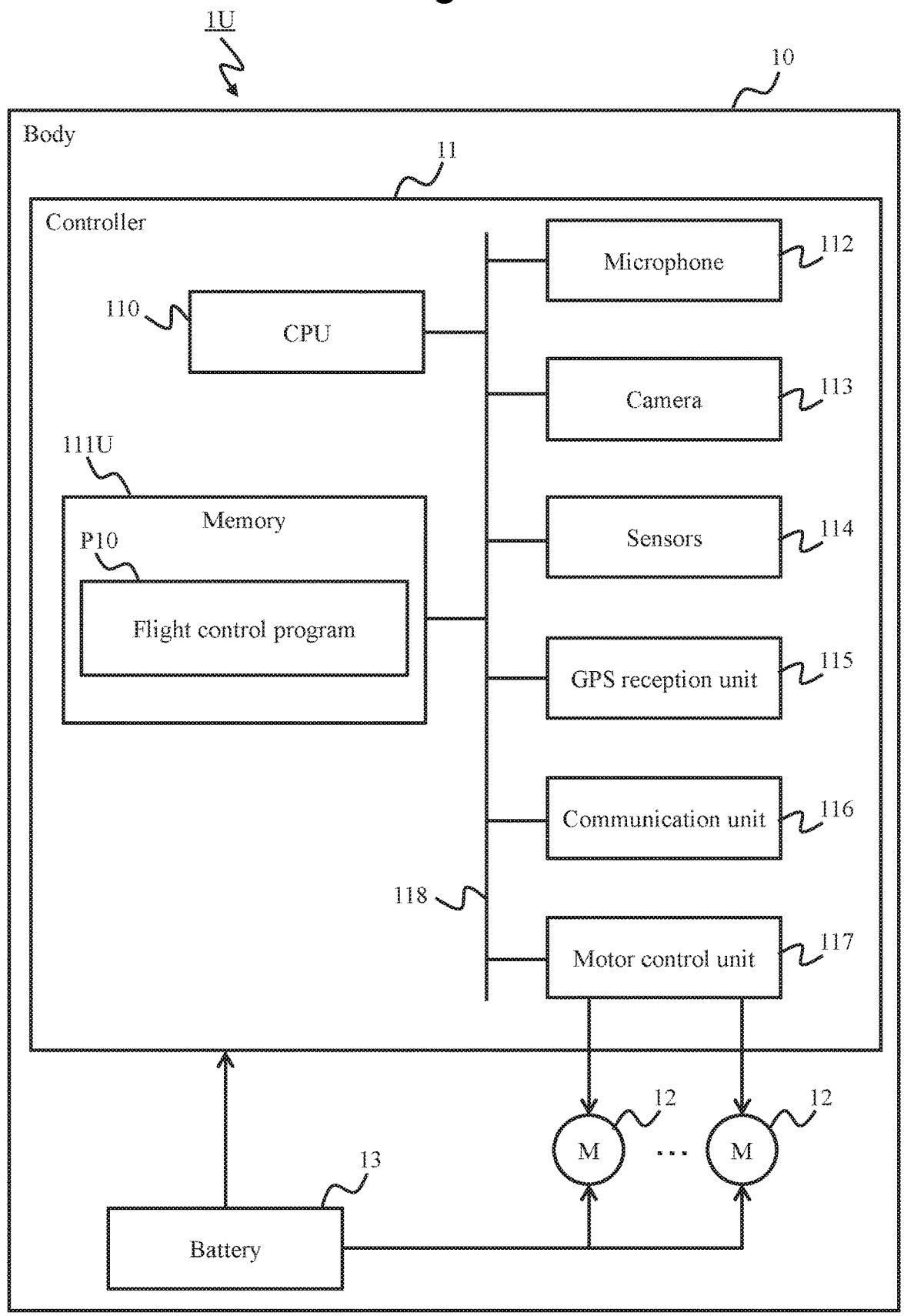
FIG. 3 is a configuration diagram of an illegitimate moving body.

FIG. 3 illustrates an exemplary configuration of the illegitimate drone 1U. The illegitimate drone 1U is different from the legitimate drone 1 described with reference to FIG. 2 in that at least the drone authentication program P11 and the one-time password (OTID_B) are not included. The illegitimate drone 1U may be different from the legitimate drone 1 in, for example, the specific configuration of the sensors 114 and the number of the motors 12, but such a difference is not essential.

Figure 4:
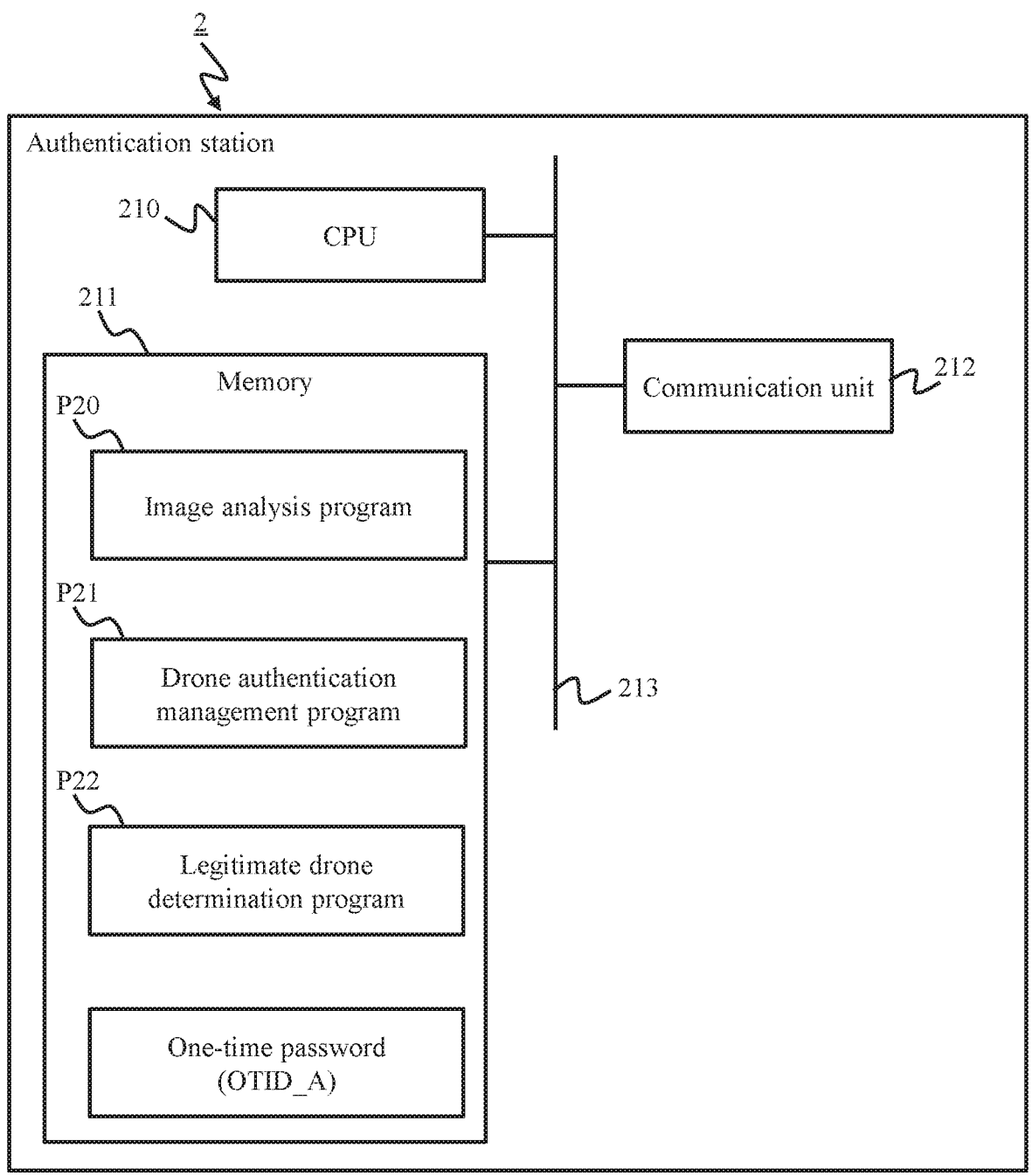
FIG. 4 is a configuration diagram of an authentication station.

FIG. 4 illustrates an exemplary configuration of the authentication station 2. The authentication station 2 includes, for example, a micro processor 210, a memory 211, and a communication unit 212. The memory 211 stores various computer programs such as the image analysis program P20, the drone authentication management program P21, and a legitimate drone determination program P22. The memory 211 also stores the one-time password (OTID_A) for encrypting query information to be transmitted to a group of drones.

The image analysis program P20 detects, for example, the number of drones flying (or parking) and the positions thereof by analyzing a satellite picture acquired from the satellite 3. The image analysis program P20 achieves the flight state acquisition function F20 illustrated in FIG. 1.

The drone authentication management program P21 transmits encrypted query information to the group of drones, acquires the report information as a response to the query information from a legitimate drone, and decrypts the report information. The drone authentication management program P21 achieves the report information acquisition function F21 illustrated in FIG. 1. The one-time password (OTID_A) corresponding to the one-time password (OTID_B) held by any legitimate drone is used to encrypt the query information.

The legitimate drone determination program P22 compares a result (the flight states of the group of drones) of the analysis on the satellite picture and the report information from the legitimate drone and determines the legitimate drone among the group of drones. The legitimate drone determination program P22 achieves the legitimate drone determination function F22 illustrated in FIG. 1.

The configurations of the computer programs P20 to P22 are not limited to the above-described examples. The programs P20 to P22 maybe achieved as a group of further segmentalized computer programs, or may be achieved as one computer program such as a drone authentication station control program.

The communication unit 212 is a device configured to achieve communication with a legitimate drone through the wireless access point 4 and the communication network CN2, communication with the satellite 3 through the communication network CN1, and communication with the user terminal 14.

The authentication station 2 does not need to be configured as one computer system, but may be configured through cooperation of multiple computer systems. Multiple virtual calculators may be generated in a physical calculator and each allocated to an authentication station for an area.

Figure 5:
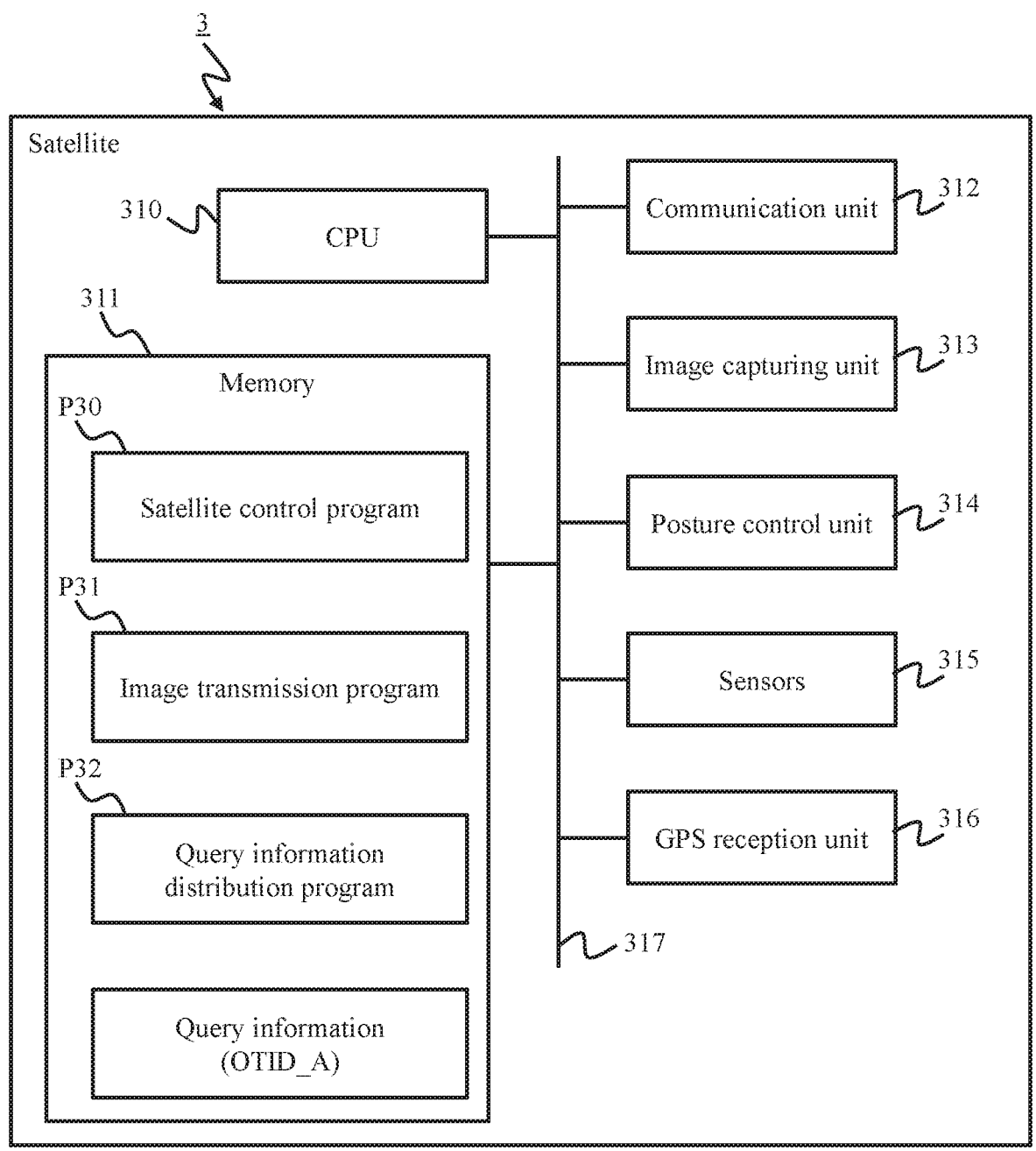
FIG. 5 is a configuration diagram of a satellite.

FIG. 5 illustrates an exemplary configuration of the satellite 3. The satellite 3 includes, for example, a micro processor 310, a memory 311, a communication unit 312, an image capturing unit 313, a posture control unit 314, sensors 315, and a GPS reception unit 316.

The memory 311 stores, for example, a satellite control program P30, an image transmission program P31, and a query information distribution program P32. The memory 311 also stores query information received from the authentication station 2 through the communication network CN1.

The satellite control program P30 controls the satellite 3. The image transmission program P31 captures a satellite picture and transmits the picture to the authentication station 2. The query information distribution program P32 distributes the query information received from the authentication station 2 to a group of drones.

The communication unit 312 is a device configured to perform communication with the authentication station 2 and transmission of the query information to the group of drones. The image capturing unit 313 is a device configured to capture a satellite picture. The posture control unit 314 is a device configured to control the posture of the satellite 3. The sensors 315 are various sensors such as an infrared sensor, a geomagnetic sensor, and a triaxial gyro sensor. The GPS reception device 316 is a device configured to acquire position information of the satellite 3 from the GPS.

FIG. 6 illustrates an exemplary drone identification result management table T20 used by the authentication station 2. When having identified a group of drones, the authentication station 2 stores a result of the identification in the management table T20. The drone identification result management table T20 stores, for example, a management number C200, a query information decryption result C201, position information C202, and a drone ID C203 in association with each other.

The management number C200 is used to distinguish a group of drones determined from a satellite picture. The query information decryption result C201 is a flag indicating whether query information transmitted from the authentication station 2 is correctly decrypted. In other words, the flag C201 indicates whether a drone is a legitimate drone having the one-time password (OTID_B) used to decrypt the query information. The position information C202 indicates the position of a drone specified by the management number C200. The drone ID C203 is an identification number provided when a drone is registered to the authentication station 2.

Only drones having management numbers #1 to #3, which correctly decrypt the query information, are legitimate drones among five drones listed in the management table T20. Drones having management numbers #4 and #5, which cannot correctly decrypt the query information, are illegitimate drones. The drone having management number #4 successfully transmits position information but does not prove that the query information is correctly decrypted. Thus, this drone is an illegitimate drone that has failed to fake.

FIG. 7 illustrates an exemplary legitimate drone management table T21 that manages legitimate drones. The legitimate drone management table T21 manages, for example, a drone name C210, a drone ID C211, a one-time password C212, a query information decryption result C213, and position information C214.

The drone name C210 is the name of a legitimate drone. A user can set a desired name to a drone. The drone ID C211 is an identification number provided to a legitimate drone by the authentication station 2. The one-time password C212 is the one-time password (OTID_B) provided by the authentication station 2 and used to decrypt query information.

The query information decryption result C213 indicates a result obtained by a legitimate drone by decrypting the query information by using the one-time password (OTID_B). The decryption result includes, for example, a request for a reply to a query, the issue time of the query information, an authentication station ID, and a control command. The control command controls operation other than communication, such as flight of a legitimate drone, and examples of the control commands include simple commands such as "increase altitude", "decrease altitude", "land", and "move from the place", and commands to add conditions to a flight plan, such as "avoid entering to a predetermined area", "set or cancel (update) a flight forbidden area", and "limit speed". The authentication station 2 can provide the control command to a predetermined drone among legitimate drones based on a result of analysis on a satellite picture. Having received the control command, the drone executes an operation in accordance with the control command or changes a flight plan with taken into account a condition in accordance with the control command. Accordingly, contact between drones can be prevented, and a drone can be forcibly expelled from an off-limits area. The control command can be transmitted to a specified drone, and in such a case, the query information includes the drone ID, the position information (acquired from the satellite), and the position information (acquired from a drone through the first communication and included in the query information through the second communication) of a target drone.

The position information C214 indicates the position of a legitimate drone. The position includes, for example, the latitude, the longitude, and the altitude. The position may include the past history of the position and a future position in a flight plan. The altitude of a legitimate drone may be a value obtained by an altitude sensor mounted on the legitimate drone.

The management table T21 may manage, for example, a battery remaining amount, a flight time, a model, a vendor name, and a user name in addition to the information listed in FIG. 7. The management table T21 does not need to be one table, but may be configured as multiple tables in association with each other.

Figure 8:
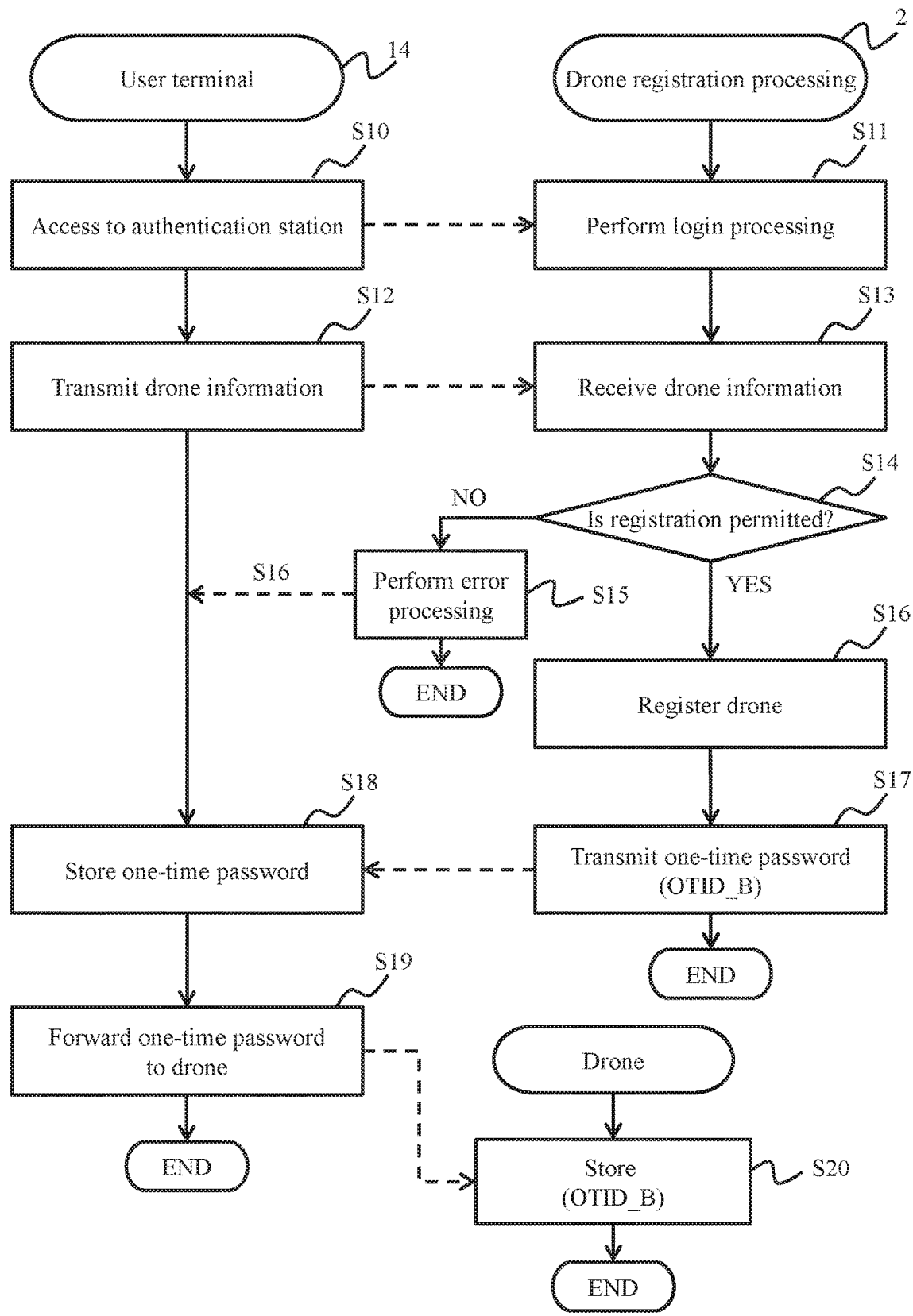
FIG. 8 is a flowchart illustrating processing of registering a moving body to the authentication station.

FIG. 8 is a flowchart illustrating processing of registering a drone to the authentication station 2. A user accesses to a drone registration service provided by the authentication station 2 by using the user terminal 14 such as a personal computer, a portable information terminal, or a cellular phone, and inputs necessary information such as a user name (S10). The drone registration service is provided as, for example, a Web service by the drone authentication management program P21. The authentication station 2 checks, for example, the user name and performs login processing (S11).

The user terminal 14 transmits, to the authentication station 2, information of a drone requesting registration (S12). The user terminal 14 transmits, for example, the full name and address of the user, a drone name, a vendor name, and a model name to the authentication station 2. When registration of flight of the drone is required in addition to registration of the drone, a flight date and time, a flight area, and a flight purpose may be additionally registered. In this case, a one-time password to be described later that proves registration may be set to have an expire date corresponding to the flight date and time.

The authentication station 2 receives the drone information received from the user terminal 14 (S13) and determines whether to permit registration of the drone information (S14). The authentication station 2 determines that registration is not permitted when, for example, the full name of the user as a drone administrator is not input (No at S14), and then performs error processing (S15). In the error processing, for example, an error message telling that an essential item is not input is returned to the user terminal 14. Alternatively, any drone of a vendor and any drone of a specification model that are specified in advance may be rejected from being registered to the authentication station 2 for safety reason.

Having determined to permit registration of the drone information received at step S13 (Yes at S14), the authentication station 2 registers the drone information to the legitimate drone management table T21 described with reference to FIG. 7 (S16). Subsequently, the authentication station 2 issues the one-time password (OTID_B) so that the registered drone can correctly decrypt the query information as a legitimate drone, and transmits the one-time password to the user terminal 14 (S17).

The user terminal 14 receives and stores the one-time password (OTID_B) (S18) and forwards the one-time password to the drone (S19). The drone stores the one-time password received from the user terminal 14 in the memory 111 (S20).

Figure 9:
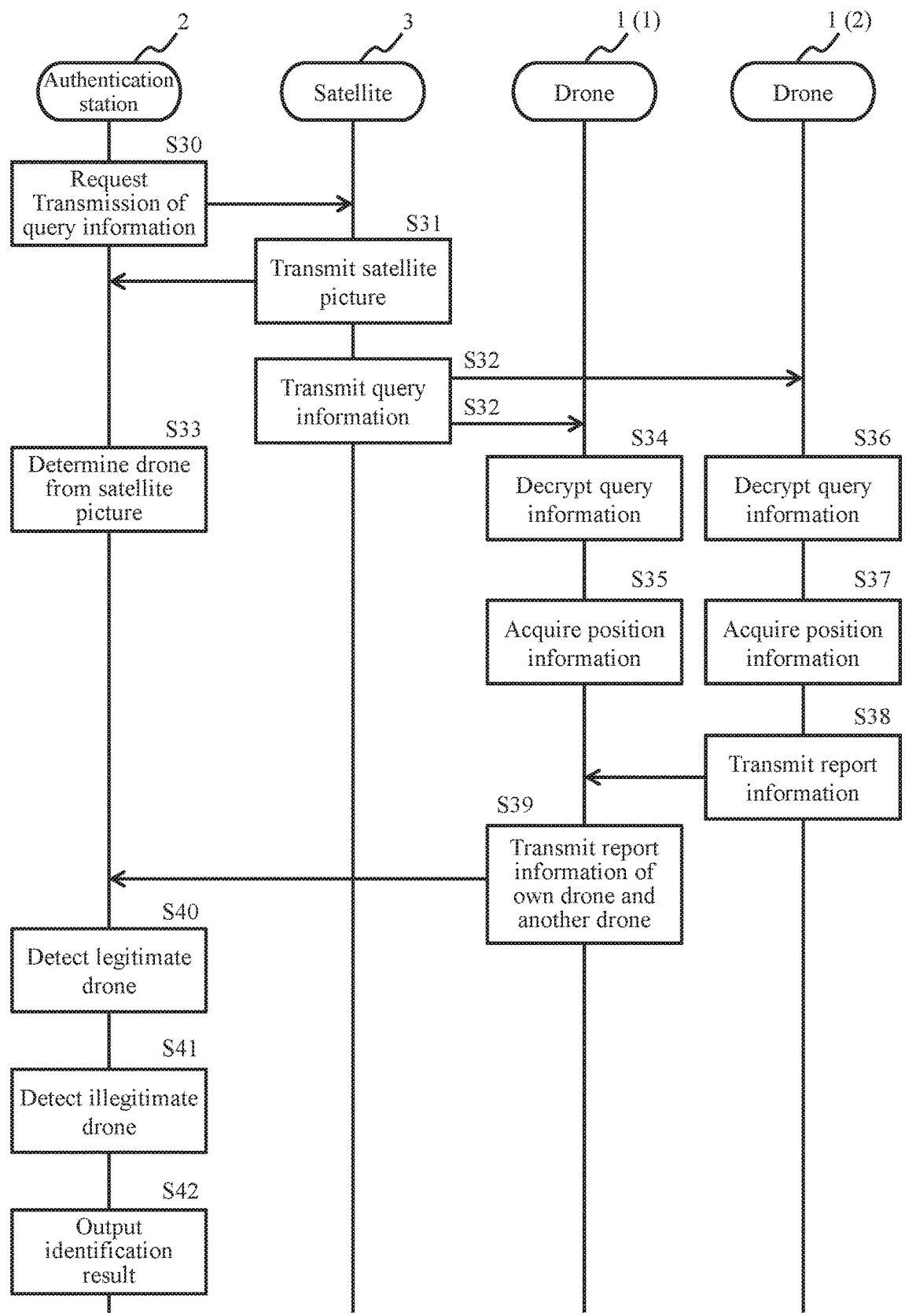
FIG. 9 is a flowchart illustrating processing of identifying a moving body.

FIG. 9 is a flowchart illustrating processing of identifying a group of drones. First, the authentication station 2 transmits the query information to the satellite 3 and requests the satellite 3 to transmit the query information to the group of drones (S30). Having received, from the authentication station 2, the request to transmit the query information, the satellite 3 captures a satellite picture and transmits image data thereof to the authentication station 2 (S31). The satellite 3 transmits the query information received from the authentication station 2 to the group of drones (S32).

The authentication station 2 determines which drones are positioned at which places by analyzing the image data of the satellite picture received from the satellite 3 (S33).

Having received the encrypted query information, any legitimate drone among the group of drones decrypts the query information by using the one-time password (OTID_B) stored in advance (S34 and S36), and acquires latest position information from the GPS (S35 and S37). Then, the legitimate drone produces a report including the position information. The position information included in the report may be position information measured after the reception of the query information, or position information corresponding to time information (query time and satellite image capturing time) included in the query information may be selected from a log storing position information and a time in association with each other and used as the position of the drone at capturing of the satellite image.

In this example, the legitimate drone 1(1) as one of the legitimate drones 1(1) and 1(2) can communicate with the wireless access point 4, but the other legitimate drone 1(2) is distant from the wireless access point 4 and thus cannot communicate with the wireless access point 4. The one legitimate drone 1(1) and the other legitimate drone 1(2) can communicate with each other in a wireless manner.

Having found the legitimate drone 1(1) flying nearby, the other legitimate drone 1(2) transmits the report information of the own drone to the legitimate drone 1(1) (S38). Having received the report information from the other legitimate drone 1(2), the one legitimate drone 1(1) forwards the report information to the wireless access point 4, or when producing the report information of the own drone, the legitimate drone 1(1) additionally transmits the report information of the own drone to the wireless access point 4 (S39).

The authentication station 2 acquires the report information of the legitimate drones 1(1) and 1(2) through the wireless access point 4 and the communication network CN2. The authentication station 2 compares the report information of a legitimate drone and a flight state (such as position information of the group of drones obtained by analyzing the satellite picture) acquired from the satellite 3, and detects the legitimate drone from among the group of drones (S40). A drone at a position in accordance with the position information included in the report information is a legitimate drone.

The authentication station 2 detects, as an illegitimate drone, any drone other than any detected legitimate drone among the group of drones based on the flight state of the entire group of drones (such as the positions of the group of drones) analyzed with the satellite picture, and the position of the legitimate drone (S41). An illegal drone is a drone having no position information corresponding to that acquired from any legitimate drone among the multiple drones included in the flight state obtained from the satellite 3. The authentication station 2 can output an identification result in response to a request from, for example, an external system or the user terminal 14 or at each acquisition of a drone identification result (S42).

The order of the steps illustrated in FIG. 9 can be changed as appropriate. For example, steps S31 and S32 may be executed in an inverted order, and step S33 may be executed before step S32.

Figure 10:
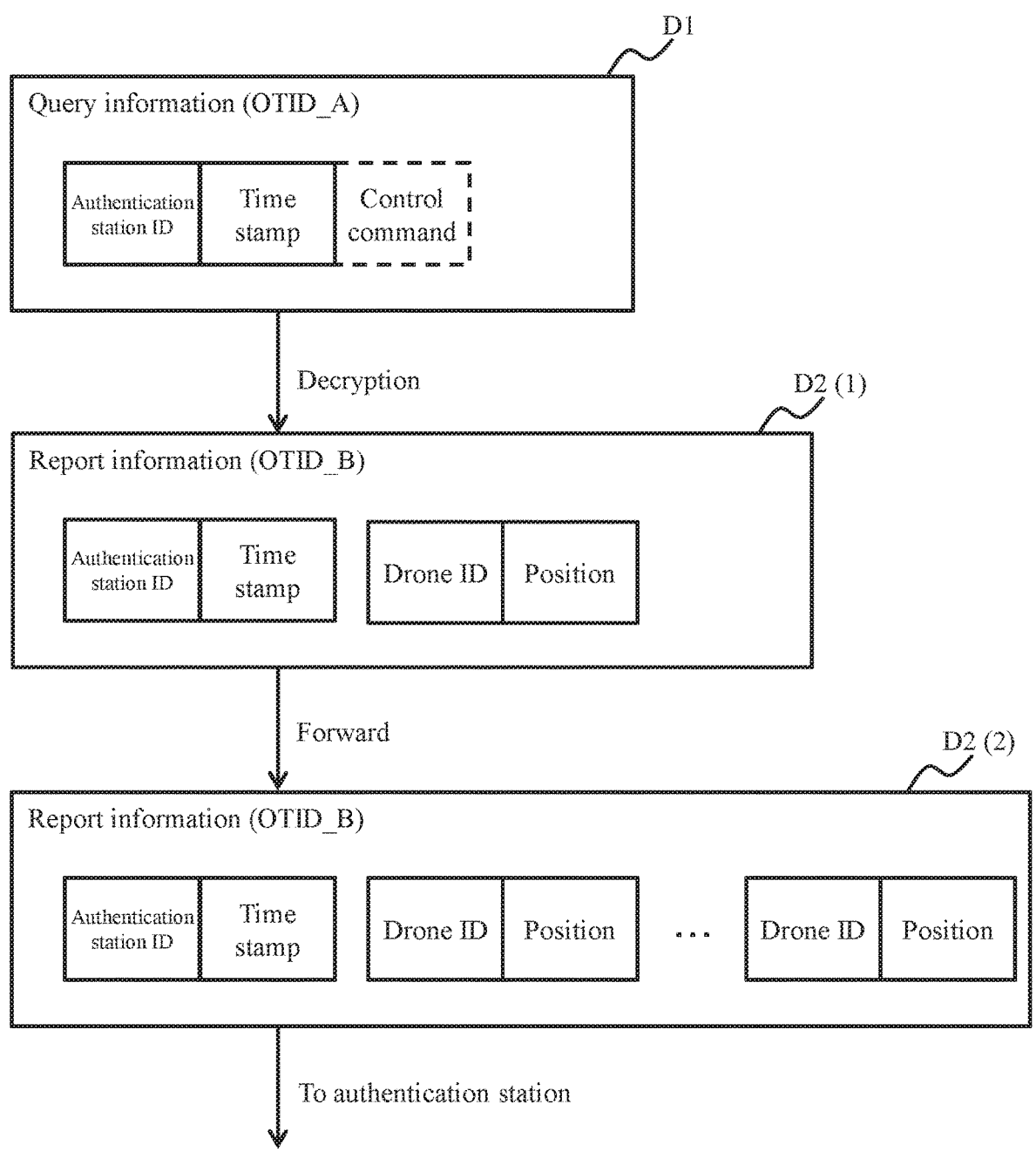
FIG. 10 is an explanatory diagram illustrating a relation between query information transmitted to a moving body and report information obtained by decrypting the query information.

The following describes an exemplary relation between query information D1 and report information D2 with reference to FIG. 10. Report information D2(1) is produced by a legitimate drone having received query information. Report information D2(2) is produced to include report information received from another legitimate drone flying nearby.

The query information D1 may include, for example, an authentication station ID as information for identifying the issuer of query information, and a time stamp indicating the issue time of the query information. When the authentication station ID is unnecessary, for example, when there is only one authentication station 2 in the entire country, the query information D1 may be produced to only include the time stamp (the issue time of the query information). The query information D1 may be produced to only include the authentication station ID without the time stamp. In other words, the query information D1 only needs to have a configuration indicating reception of information (query information) that allows a legitimate drone to produce and transmit report information.

Thus, the query information D1 may only include, for example, a control command having a content such as "transmit report information". In addition to the command instructing report information transmission, the control command may include a command instructing emergency landing, a command instructing leaving from the current flight area, and an instruction requesting the user to contact the authentication station 2. As illustrated in FIG. 10, the query information D1 may include all of the authentication station ID, the time stamp, and at least one control command. The following description will be made on an example in which the query information D1 includes the authentication station ID and the time stamp.

Having received the query information D1, a legitimate drone produces the report information D2. The report information D2 includes, for example, a query information decryption result and own drone information. The query information decryption result is information obtained by decrypting the encrypted query information, and is the authentication station ID and the time stamp. When the query information includes a control command, the decryption result may include the content of the control command or a response to the control command, or may include no information related to the control command.

The own drone information is information related to the legitimate drone having received the query information, and includes, for example, the drone ID and the position information. When the authentication station 2 needs to acquire, for example, the user name of the legitimate drone, the report information D2 preferably includes the drone ID. However, when it is only needed to identify whether a flying drone determined from a result of analysis on a satellite picture is legitimate, the report information does not need to include the drone ID. This is because whether the drone is legitimate can be determined from the position of the drone. In the following description, the own drone information includes the drone ID and the position information.

Having produced the report information D2(1), the legitimate drone transmits the information to the authentication station 2. However, when there is no wireless access point 4 with which the legitimate drone can directly communicate, the legitimate drone detects another legitimate drone flying nearby and transmits the report information D2(1) of the own drone to the detected legitimate drone. A drone used to relay the report information D2(1) can be detected by analyzing, for example, flight noise obtained by the microphone 112 or an image obtained by the camera 113.

A legitimate drone requested to perform the relay produces the report information D2(2) including information of two legitimate drones. Query information decryption results (authentication station IDs and time stamps) are normally identical to each other, and thus the report information D2(2) includes only one query information decryption result. However, the present invention is not limited thereto, and the report information D2(2) may be generated to include all report information D2(1) of the respective legitimate drones. In this case, the report information D2(2) may include, for example, "authentication station ID, time stamp, drone ID, position", "authentication station ID, time stamp, drone ID, position", "authentication station ID, time stamp, drone ID, position", . . . .

Figure 11:
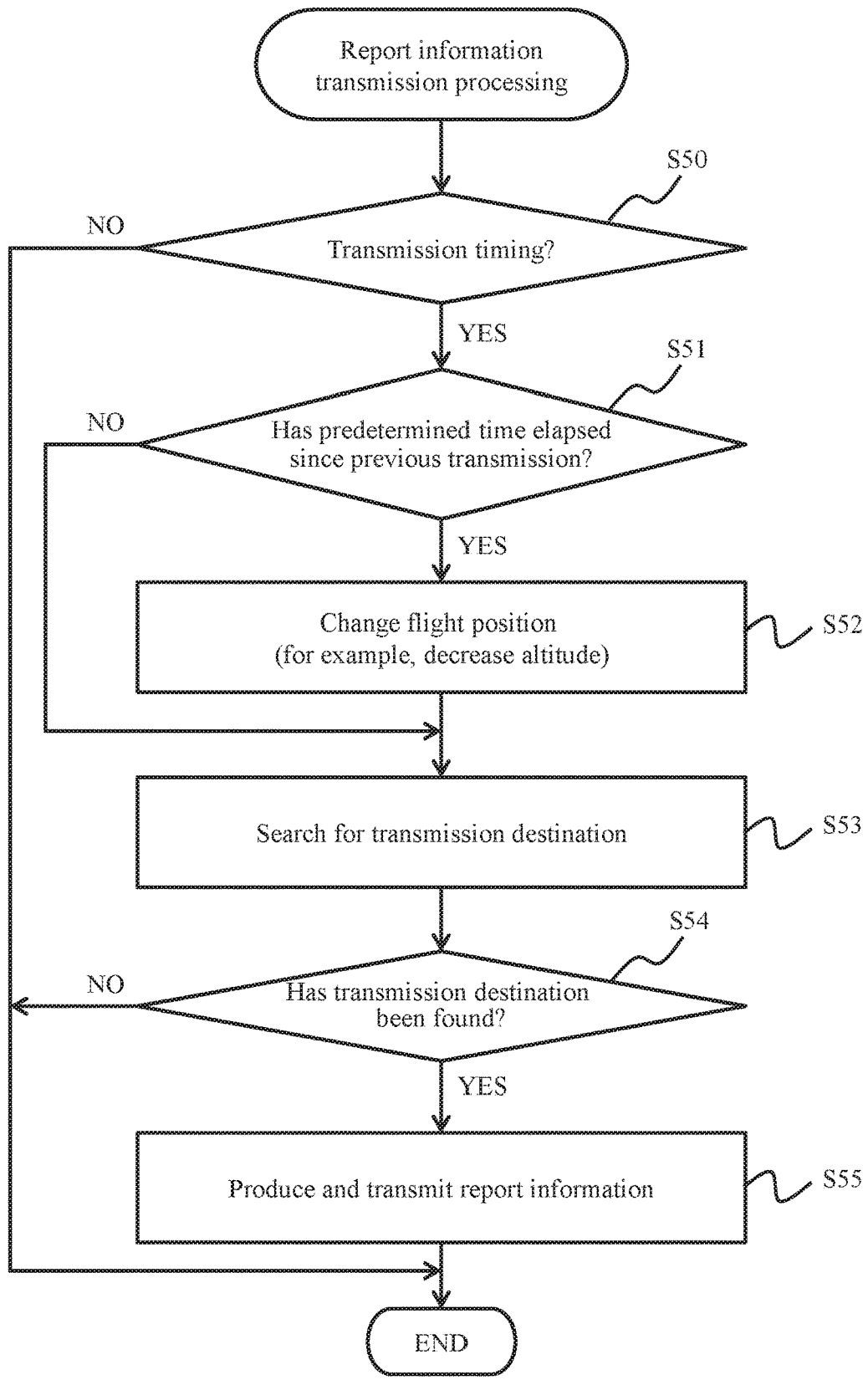
FIG. 11 is a flowchart illustrating processing of forwarding the report information between moving bodies.

FIG. 11 is a flowchart illustrating processing that a legitimate drone forwards the report information. The legitimate drone determines whether it is a transmission timing of the report information (S50). The transmission timing of the report information is a timing, for example, when query information is received, when there is query information in response to which no report information has been transmitted, or when report information is received from another legitimate drone. Alternatively, no query information may be used while a drone is flying, but query information (or authentication information corresponding thereto) may be received and stored through communication with the authentication station 2 in advance at drone purchase (registration), at drone registration update, or before flight so that report information is produced and transmitted as a reply to the query information during flying. In this case, report information is transmitted multiple times for one piece of query information, and a legitimate drone moves while autonomously transmitting report information periodically, at each predetermined flight distance, or at each change of flight area.

Having determined that it is the transmission timing of the report information (Yes at S50), the legitimate drone determines whether a predetermined time has elapsed since the previous transmission of report information (S51). The predetermined time is, for example, a report deadline time set in advance as a time interval at which report information is to be transmitted. The report deadline time may be set to the legitimate drone at registration to the authentication station 2 or may be specified in query information. The report deadline time may be a fixed value or a variable value set in accordance with, for example, usage of a drone or a user property.

When having determined that the predetermined report deadline time has elapsed since the time of the previous transmission of report information (Yes at S51), the legitimate drone changes the position thereof by a predetermined distance or more to find the wireless access point 4 or another legitimate drone used as a relay device (S52). For example, the legitimate drone decreases the altitude thereof or changes the flight path thereof.

When having determined that the predetermined report deadline time has not elapsed since the time of the previous transmission of report information (No at S51), the legitimate drone skips step S52 and transitions to step S53 described below.

The legitimate drone searches for the wireless access point 4 or another legitimate drone as the destination of the report information (S53). The legitimate drone determines whether the destination of the report information has been found (S54). When having found the destination (Yes at S54), the legitimate drone produces and transmits report information (S55). A report includes position information and time information (such as the production or transmission time of the report or the measurement time of the position information). The position information and the time information can be used to determine whether a drone is legitimate or illegitimate based on a satellite image captured at a time close to the time information. When transmitting only the report information of the own drone, the legitimate drone produces and transmits the report information D2(1) illustrated in FIG. 10. When transmitting report information of another legitimate drone in addition to the report information of the own drone, the legitimate drone produces and transmits the report information D2(2) illustrated in FIG. 10.

The timing of producing the report information is not limited to a timing after the destination is found, but may be a timing before the destination is found. For example, the report information may be produced and stored in the memory 111 when it is determined that the transmission timing is reached at step S50. However, when the position is changed at step S52, the position information in the report information is corrected with a latest value.

FIG. 12 illustrates an exemplary screen G10 of a drone identification result provided by the authentication station 2. For example, which drone is legitimate or illegitimate can be displayed on the screen G10 in a distinguished manner in view of the sky from the ground. Scenery including, for example, a cloud, the sun, the moon, a building, and a mountain may be displayed together or may be omitted. All or part of drones and scenery may be displayed in a simplified manner. For example, display of north, south, east, and west may be added to the screen G10.

In the example illustrated in FIG. 12, three legitimate drones and two illegitimate drones are displayed on the screen G10 in a distinguished manner based on names and colors. In addition, for example, the position, speed, and user name of each drone may be displayed near the drone.

According to the present embodiment thus configured, it is possible to identify which drone is legitimate among a group of drones. According to the present embodiment, the flight state of the entire group of drones is recognized based on a satellite picture, and any legitimate drone is determined from a result of analysis on report information. Thus, in the present embodiment, it is possible to simultaneously identify which drone is illegitimate among the group of drones.

In the present embodiment, a result of the identification of the group of drones can be output to, for example, an external system or the user terminal 14, and thus can be exploited, for example, to improve a security system and determine a flight path. For example, a facility administrator can use the identification result output from the authentication station 2 to reinforce caution or prompt attention by broadcasting. For example, a user can use the identification result output from the authentication station 2 to change the flight path of a legitimate drone managed by the user to an area in which there are a smaller number of illegitimate drones.

In the present embodiment, since an image of a group of drones is captured from an overhead space thereof by using the satellite 3, the flight state of the group of drones can be detected in a relatively wide range. However, the present invention is not limited to the satellite 3. The flight state may be detected from above the group of drones by a camera mounted on an airship 3A to be described later. Alternatively, the flight state may be detected by capturing an image of the group of drones from the vicinity of the roof of a tall building or a floor halfway through the building. Alternatively, the flight state of the group of drones may be detected by a flying monitoring drone. The image capturing of the group of drones may be performed from a manned aircraft operated by a pilot, or may be performed from the ground or water as described in an embodiment to be described later. A satellite picture does not need to be a still image, but may be moving image data. Still image data or moving image data of a satellite picture can be generated as digital data and provided with compression processing as appropriate. In addition, the digital data of a satellite picture may be encrypted and transmitted to the authentication station 2.

In the present embodiment, report information is received from a legitimate drone by using the wireless LAN access point 4. Thus, in an urban region, the authentication station 2 can relatively easily acquire report information from a legitimate drone by using any existing access point 4. A drone on which a relay access point is mounted may be flown in a predetermined area.

Embodiment 2

Figure 13:
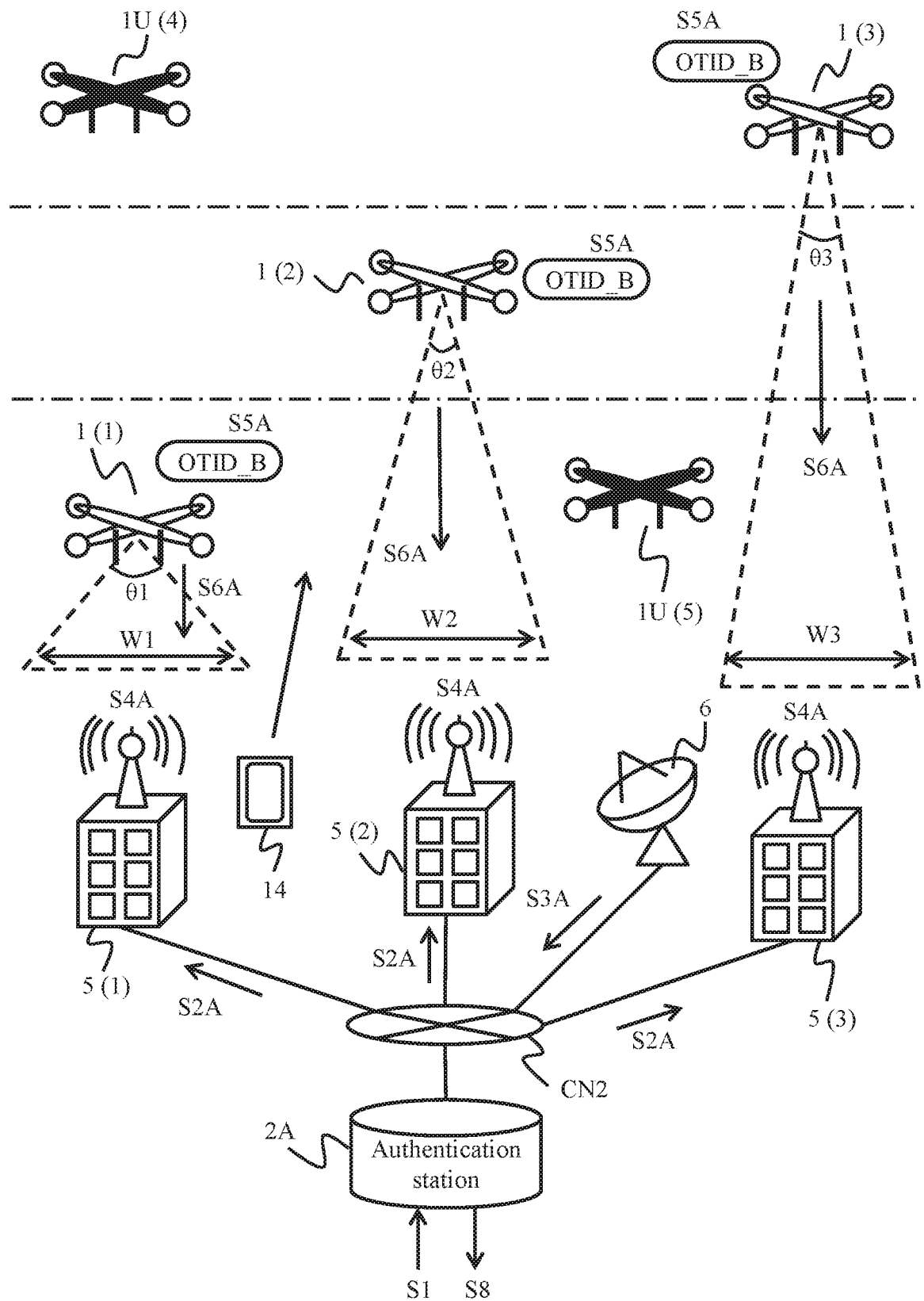
FIG. 13 illustrates an entire schematic diagram of a moving body identification system according to a second embodiment.
Figure 14:
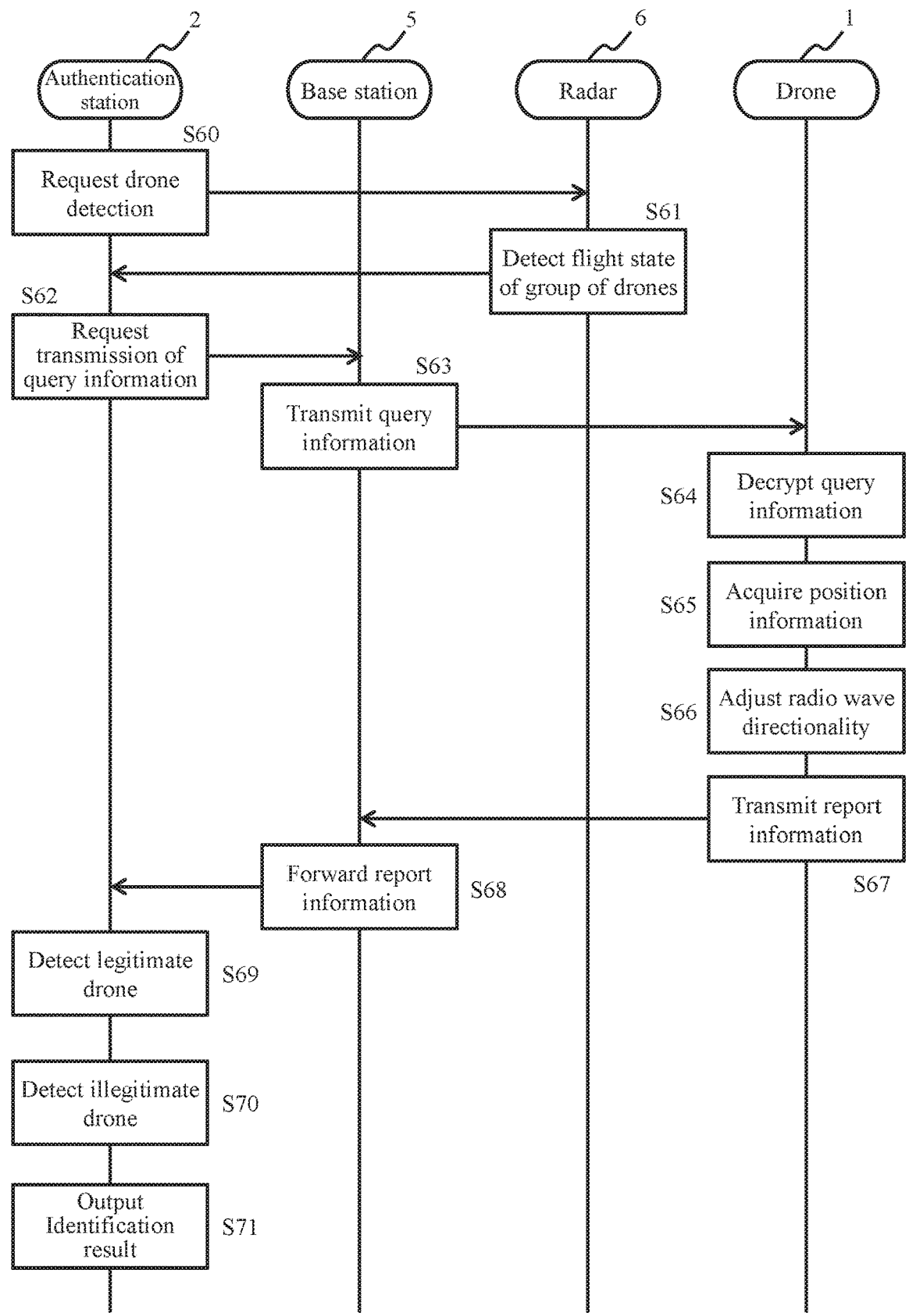
FIG. 14 is a flowchart illustrating processing of identifying a moving body.

The following describes a second embodiment with reference to FIGS. 13 and 14. The present embodiment corresponds to a modification of the first embodiment, and thus mainly describes any difference from the first embodiment. In the present embodiment, the authentication station 2 communicates with a legitimate drone by using a cellular phone base station 5. In the first embodiment, a transmission means (the satellite 3) configured to transmit query information to a group of drones is different from a reception means (the wireless access point 4, the communication network CN2) configured to acquire report information from a legitimate drone. However, in the present embodiment, the transmission means configured to transmit query information to a group of drones and the reception means configured to receive report information from a legitimate drone are each achieved by the cellular phone base station 5 and the communication network CN2, and thus identical.

FIG. 13 illustrates an entire schematic diagram of an unmanned aircraft identification system according to the present embodiment. In the present embodiment, the cellular phone base station (hereinafter referred to as a base station) 5 is used in place of the wireless access point 4. In addition, in the present embodiment, a radar device 6 on the ground is used in place of the satellite 3. The radar device 6 may be a fixed device or a movable device. The "ground" may be referred to as "the other side". The radar device 6 may be referred to as an "other-side moving state monitoring device" configured to monitor a movement area (flight area) from the other side. A group of drones may be monitored from on or in a body of water rather than from the ground. In the following, base stations 5(1) to 5(3) are collectively referred to as the base station 5 when not distinguished.

The legitimate drones 1(1) to 1(3) are each controlled to adjust the directionality of radio wave used in a cellular phone communication network in accordance with the altitude thereof and fly while maintaining a position at which communication is constantly possible with at least one base station 5.

For example, the legitimate drone 1(1) at low altitude expands the directionality θ1 of radio wave. Accordingly, the legitimate drone 1(1) at altitude low can have an increased communicable area W1 enough to communicate with the base station 5(1). Conversely, when the legitimate drone 1(1) narrows down the directionality θ1 of radio wave, the communicable area W1 is reduced so that communication with the base station 5 is impossible.

The legitimate drone 1(3) at high altitude narrows down the directionality θ3 of radio wave. Accordingly, the legitimate drone 1(3) at high altitude has a reduced communicable area W3 to communicate only with the particular base station 5(3). When the legitimate drone 1(3) expands the directionality θ3 of radio wave, the communicable area W3 is increased enough to communicate with the multiple base stations 5(2) and 5(3). Thus, consumption at the battery 13 of the legitimate drone 1(3) becomes significant, potentially leading to a shorter flight time.

The legitimate drone 1(2) at intermediate altitude adjusts the directionality θ2 of radio wave in accordance with the altitude. In this manner, a communication path to the base station 5 can be established with reduced consumption at the battery 13 by adjusting the directionality θ of radio wave in accordance with the altitude of a legitimate drone.

The ground radar device 6 is, for example, a Doppler radar device connected with the authentication station 2 through the communication network CN2. The ground radar device 6 detects the flight state (positions, for example) of a group of drones flying in a predetermined area, and transmits the flight state to the authentication station 2.

The following schematically describes the entire operation of the unmanned aircraft identification system according to the present embodiment. First, a user registers a drone managed by the user to the authentication station 2 (S1). The authentication station 2 requests to the base station 5 to transmit query information (S2A). The ground radar device 6 detects the flight state of a group of drones and transmits the flight state to the authentication station 2 in response to a request from the authentication station 2 or periodically (S3A).

The base station 5 transmits query information received from the authentication station 2 into the communication area of the base station 5 (S4A). Any legitimate drone having received the query information from the base station 5 decrypts the query information (S5A). The legitimate drone produces report information and transmits the report information to the authentication station 2 (S6A). Each legitimate drone controls the flight position thereof to enable communication with the authentication station 2 through the base station 5, and thus does not need to use another legitimate drone as a relay device. However, like an embodiment to be described later, report information may be forwarded between legitimate drones in a bucket-brigade manner when the cellular phone communication network is used.

FIG. 14 is a flowchart of processing of identifying a group of drones. The authentication station 2 requests the ground radar device 6 to detect the flight state of the group of drones (S60). The ground radar device 6 transmits the flight state such as the positions and speeds of the group of drones to the authentication station 2 (S61). The authentication station 2 requests the base station 5 to transmit the query information (S62). The base station 5 transmits query information to surrounding of the own station in response to the request from the authentication station 2 (S63). Steps S62 and S63 may be executed before or simultaneously with step S60.

Any legitimate drone having received the query information from the base station 5 decrypts the query information (S64), and acquires the position information of the own drone from the GPS (S65). The legitimate drone adjusts the directionality of radio wave for communication with the base station 5 in accordance with the current altitude (S66). Then, the legitimate drone transmits report information to the authentication station 2 (S67). Step S66 may be executed, for example, before step S64 or after step S67.

Having received the report information from the legitimate drone, the base station 5 forwards the report information to the authentication station 2 through the communication network CN2 (S68).

The authentication station 2 identifies any legitimate drone among a group of drones based on the report information from the legitimate drone and the flight state of the group of drones from the ground radar device 6 (S69), and also identifies any illegitimate drone among the group of drones (S70). The authentication station 2 outputs a result of the identification of the group of drones to, for example, an external system or the user terminal 14 (S71).

The present embodiment thus configured achieves effects same as those described in the first embodiment. In addition, since the cellular phone base station 5 is used to transmit query information to a legitimate drone and receive report information from the legitimate drone in the present embodiment, a group of drones can be monitored and identified in a countryside where only a small number of wireless access points 4 are available.

Embodiment 3

Figure 15:
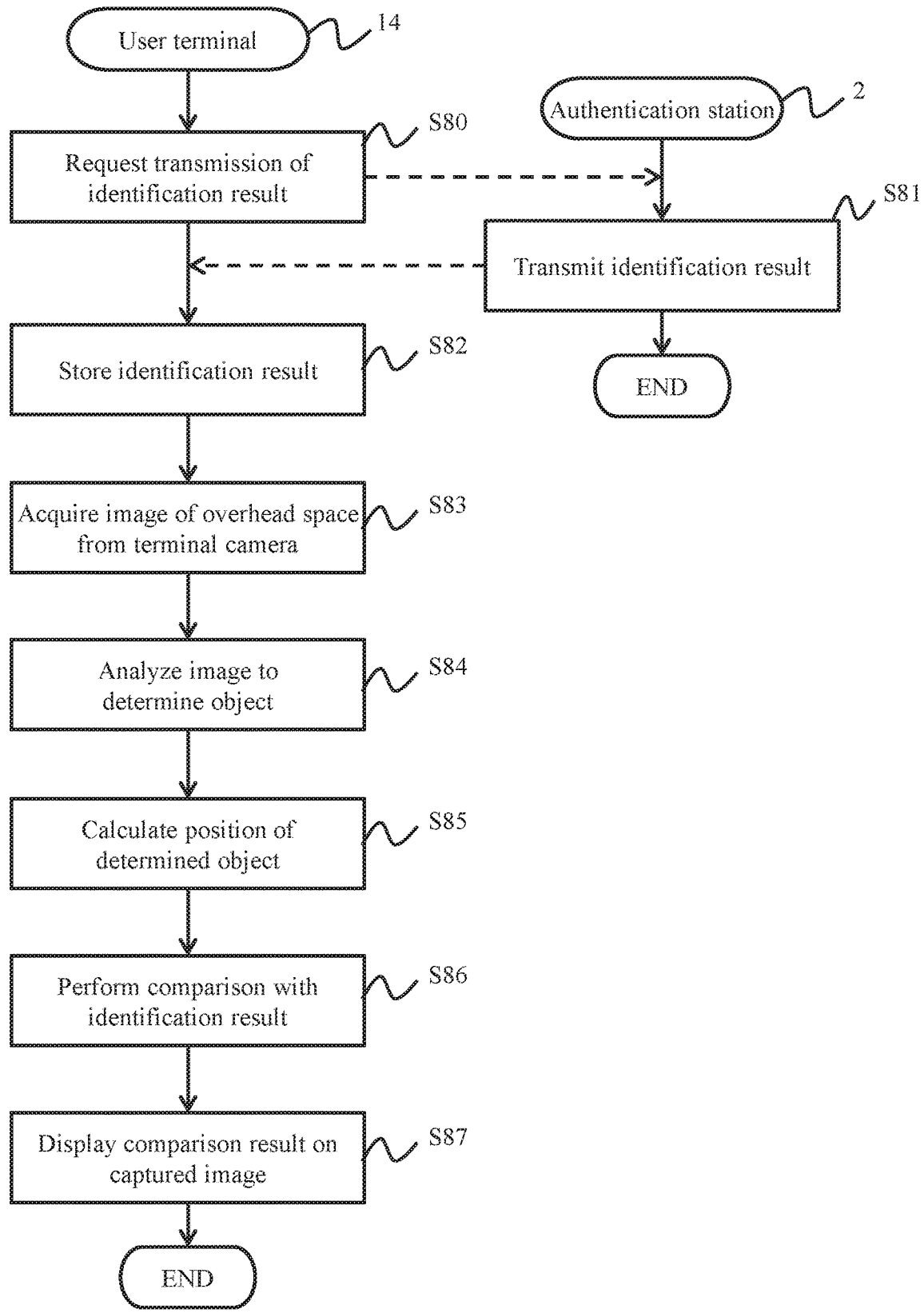
FIG. 15 is a flowchart illustrating processing of displaying a moving body identification result on a user terminal according to a third embodiment.

The following describes a third embodiment with reference to FIG. 15. In the present embodiment, a result of drone identification by the authentication station 2 is displayed on the user terminal 14.

The user terminal 14 requests a result of identification of a group of drones to the authentication station 2 (S80). The authentication station 2 transmits the result of identification of the group of drones to the user terminal 14 (S81). The user terminal 14 stores the result of identification of the group of drones acquired from the authentication station 2 (S82). The user terminal 14 acquires an image of an overhead space by using a camera mounted on the user terminal or an external camera connected with the user terminal (S83).

The user terminal 14 analyzes the captured image to determine any object in the image (S84) and calculates the position of the determined object (S85). For example, the user terminal 14 includes a GPS reception function or a gyro sensor, and can set the position of the terminal to be an approximate position of the object or calculate the position of the object by adjusting the position of the object based on the direction, angle of view, zoommagnification, or the like of the image capturing by the camera.

The user terminal 14 compares the calculated position of the object and the result of identification of the group of drones acquired from the authentication station 2 (S86) and displays a result of the comparison over the image acquired at step S83 (S87). A drone is specified when the position of the drone in the captured image is close to only one drone position included in the drone identification result. The user terminal 14 stores image data corresponding to the model name of a legitimate drone, and thus, when there are multiple close drone positions, determination is made based on matching between the camera captured image and an image included in matching data or by a user based on these images arranged on a display. When the captured image is not similar to the image data, the drone is identified as an illegal drone. A synthesis image of a result of the determination is displayed on a display provided to the user terminal 14 or an external display connected with the user terminal 14.

The present embodiment thus configured achieves effects same as those of the first embodiment. In addition, since the user terminal 14 can display a result of identification of a group of drones by the authentication station 2 over an image captured by the camera of the user terminal 14 in the present embodiment, a user can easily determine which drone is legitimate or illegitimate among a group of drones in an overhead space. The present embodiment may be combined with any of the first and second embodiments described above. The present embodiment may be also combined with a fourth embodiment to be described later.

Embodiment 4

Figure 16:
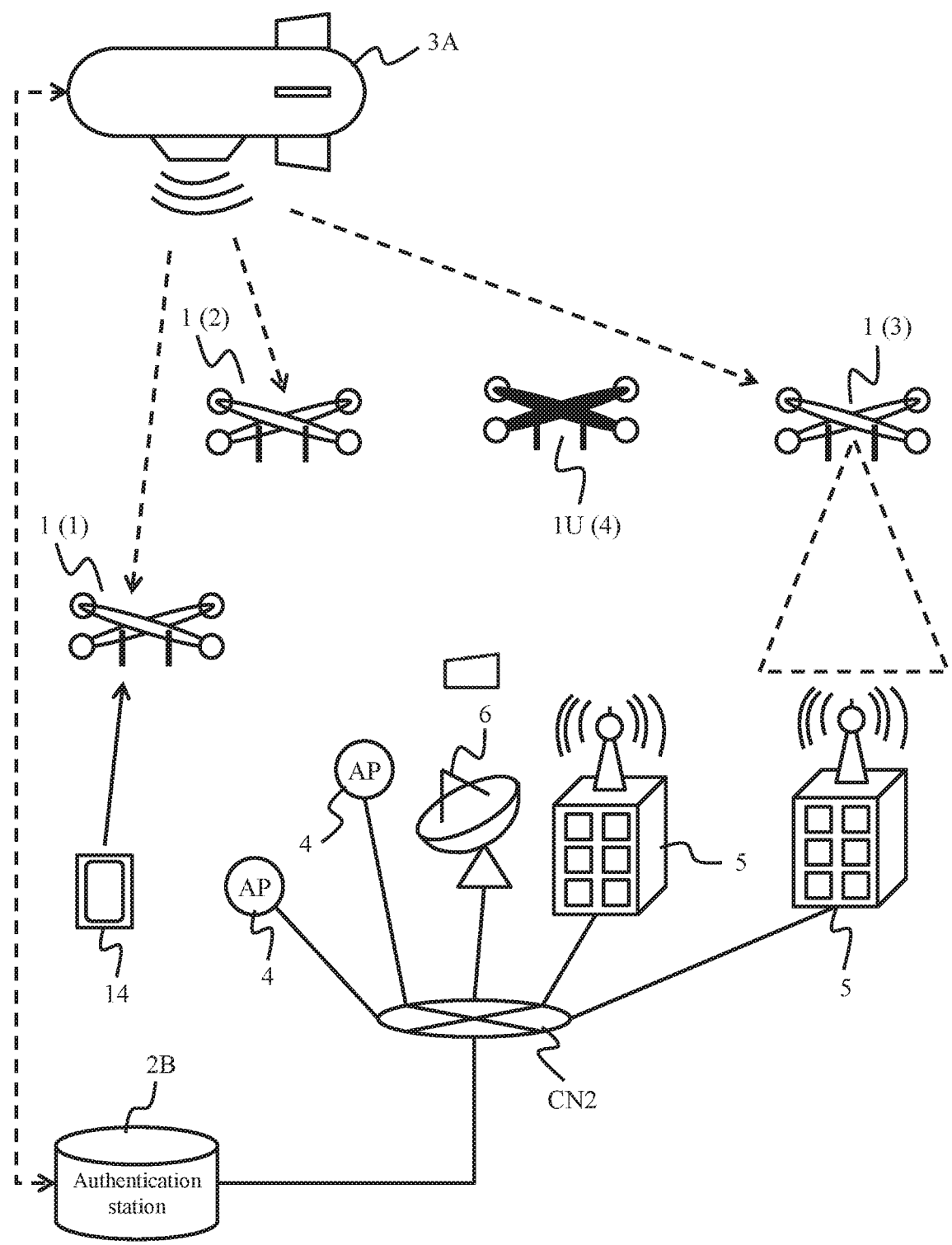
FIG. 16 illustrates an entire schematic diagram of a moving body identification system according to a fourth embodiment.

FIG. 16 illustrates an entire schematic diagram of an unmanned aircraft identification system according to the fourth embodiment. In the present embodiment, the wireless LAN access point 4 and the cellular phone base station 5 can be both used to communicate with a legitimate drone. In the present embodiment, for example, the airship 3A is used in place of the satellite 3. A monitoring drone or a manned aircraft may be used in place of the airship 3A. The present embodiment thus configured achieves the effects of the first and second embodiments.

The present invention is not limited to the above-described embodiments. The skilled person in the art may perform, for example, various kinds of additions and modifications without departing from the scope of the present invention.

REFERENCE SIGNS LIST

1: drone (moving body), 2: authentication station, 3: satellite, 3A: airship, 4: wireless access point, 5: cellular phone base station, 6: radar device, 14: user terminal

The invention claimed is:

1. A moving body identification system for identifying a moving body, the system being configured to:
   acquire moving state information including first position information of multiple moving bodies sensed by a moving state monitoring device configured to monitor a moving state of the moving body;
   acquire, from the moving body, report information including second position information of the moving body measured by the moving body;
   identify a registration status of the moving body based on the first position information and the second position information;
   transmit query information to the moving body; and
   receive the second position information and a reply to the query information from the moving body;
   wherein the query information includes a control command to move the moving body, in response to which the moving body changes its location in accordance with the control command.

2. The moving body identification system according to claim 1, being further configured to:
   store, in the moving body, encryption control information for decrypting encrypted query information; and
   communicate, with the moving body, the query information and the reply to the query information in an encrypted manner by using the encryption control information.

3. The moving body identification system according to claim 1, wherein
   the first position information and the second position information each include time information taken to produce the information, and
   the time information is used to identify the registration status of the moving body based on the first position information and the second position information.

4. The moving body identification system according to claim 1, wherein the query information includes a moving body ID or position information of a moving body on which the command is to be performed.

5. The moving body identification system according to claim 1, wherein the registration status indicates whether the moving body has successfully gone through a registration process for registering the moving body with an authentication station.

6. The moving body identification system according to claim 1, wherein, when the moving body is unable to perform direct communication with the moving body identification system, the moving body identification system acquires the report information of the moving body from another moving body that receives the report information from the moving body.

7. The moving body identification system according to claim 1, wherein the report information includes only the second position information.

8. The moving body identification system according to claim 1, wherein the report information includes at least one of moving direction and moving speed of the moving body.

9. A moving body identification method of identifying a moving body, the method comprising:

acquiring moving state information including first position information of multiple moving bodies sensed by a moving state monitoring device configured to monitor a moving state of the moving body;

acquiring, from the moving body, report information including second position information of the moving body measured by the moving body;

identifying a registration status of the moving body based on the first position information and the second position information;

transmitting query information to the moving body; and receiving the second position information and a reply to the query information from the moving body;

wherein the query information includes a control command to move the moving body, in response to which the moving body changes its location in accordance with the control command.

10. The moving body identification method according to claim 9, wherein the registration status indicates whether the moving body has successfully gone through a registration process for registering the moving body with an authentication station.

* * * * *